(12) United States Patent
Fu et al.

(10) Patent No.: US 8,075,859 B2
(45) Date of Patent: Dec. 13, 2011

(54) NANOCOMPOSITE PARTICLE AND PROCESS OF PREPARING THE SAME

(75) Inventors: Guoyi Fu, Ellicott City, MD (US); Steven M. Augustine, Ellicott City, MD (US)

(73) Assignee: Millennium Inorganic Chemicals, Inc., Houston, TX (US)

( * ) Notice: Subject to any disclaimer, the term of this patent is extended or adjusted under 35 U.S.C. 154(b) by 0 days.

(21) Appl. No.: 12/502,678

(22) Filed: Jul. 14, 2009

(65) Prior Publication Data
US 2009/0324472 A1 Dec. 31, 2009

Related U.S. Application Data

(62) Division of application No. 11/509,339, filed on Aug. 24, 2006.

(51) Int. Cl.
- *B01D 53/56* (2006.01)
- *B01D 53/86* (2006.01)
- *B01J 8/00* (2006.01)
- *B01J 23/00* (2006.01)
- *B01J 21/00* (2006.01)
- *B01J 20/00* (2006.01)
- *C01B 21/00* (2006.01)

(52) U.S. Cl. ............ 423/239.1; 502/242; 502/254; 502/255; 502/256; 502/257; 502/258; 502/259; 502/260; 502/261; 502/262; 502/263; 502/302; 502/304; 502/308; 502/309; 502/310; 502/324; 502/326; 502/327; 502/328; 502/329; 502/330; 502/331; 502/332; 502/333; 502/334; 502/335; 502/336; 502/337; 502/338; 502/339; 502/349; 502/350; 502/351; 502/353; 502/354; 502/355; 502/407; 502/415; 502/439

(58) Field of Classification Search .......... 502/242, 502/254–263, 308–310, 324, 326–339, 349, 502/350, 353, 354, 355, 407, 415, 439, 302–304, 502/351; 423/239.1

See application file for complete search history.

(56) References Cited

U.S. PATENT DOCUMENTS

| | | | |
|---|---|---|---|
| 3,279,884 A | 10/1966 | Nonnenmacher et al. | |
| 4,012,338 A | 3/1977 | Urwin | |
| 4,048,112 A | 9/1977 | Matsushita et al. | |
| 4,085,193 A | 4/1978 | Nakajima et al. | |
| 4,929,586 A | 5/1990 | Hegedus et al. | |
| 5,021,392 A | 6/1991 | Daly et al. | |
| 5,137,855 A | 8/1992 | Hegedus et al. | |
| 5,330,953 A | 7/1994 | Meina | |
| 5,652,192 A | 7/1997 | Matson et al. | |
| 5,897,945 A * | 4/1999 | Lieber et al. | 428/323 |
| 5,922,294 A | 7/1999 | Chattha et al. | |
| 6,274,763 B1 | 8/2001 | Ruedinger et al. | |
| 6,464,951 B1 * | 10/2002 | Kittrell et al. | 423/240 R |
| 6,576,589 B1 | 6/2003 | Na et al. | |
| 6,596,247 B1 * | 7/2003 | Iizuka et al. | 423/213.2 |
| 6,699,448 B2 * | 3/2004 | Wu et al. | 423/239.1 |
| 6,709,643 B1 * | 3/2004 | Ozkan et al. | 423/239.1 |
| 6,743,749 B2 * | 6/2004 | Morikawa et al. | 502/349 |
| 6,806,225 B1 * | 10/2004 | Ikeda et al. | 502/326 |
| 6,838,004 B1 * | 1/2005 | Yang et al. | 210/660 |
| 6,949,235 B2 * | 9/2005 | Brown et al. | 423/213.2 |
| 6,964,758 B2 * | 11/2005 | Cortright et al. | 423/648.1 |
| 7,041,263 B2 * | 5/2006 | Sung | 423/239.1 |
| 7,081,234 B1 * | 7/2006 | Qi et al. | 423/592.1 |
| 7,083,767 B2 * | 8/2006 | Zones et al. | 423/239.1 |
| 7,097,817 B2 * | 8/2006 | Brisley et al. | 423/245.3 |
| 7,125,536 B2 * | 10/2006 | Fu et al. | 423/592.1 |
| 7,175,822 B2 * | 2/2007 | Nakatsuji | 423/239.1 |
| 7,357,903 B2 * | 4/2008 | Zhou et al. | 423/239.1 |
| 7,387,839 B2 * | 6/2008 | Gueneau et al. | 428/428 |
| 7,628,968 B2 * | 12/2009 | Augustine et al. | 423/239.1 |
| 7,712,308 B2 * | 5/2010 | Rinaldi et al. | 60/301 |
| 7,740,819 B2 * | 6/2010 | Morita et al. | 423/247 |
| 2002/0141923 A1 * | 10/2002 | Kittrell et al. | 423/245.3 |
| 2002/0149656 A1 * | 10/2002 | Nohr et al. | 347/95 |
| 2003/0045425 A1 * | 3/2003 | Ruth et al. | 502/325 |
| 2003/0103889 A1 | 6/2003 | Mirsky et al. | |
| 2004/0241080 A1 * | 12/2004 | Nagy et al. | 423/447.3 |
| 2004/0241427 A1 | 12/2004 | Zhu et al. | |
| 2005/0008557 A1 * | 1/2005 | Yadav et al. | 423/274 |
| 2005/0042151 A1 | 2/2005 | Alward et al. | |
| 2005/0239643 A1 | 10/2005 | Benderly et al. | |
| 2006/0083694 A1 * | 4/2006 | Kodas et al. | 424/46 |
| 2006/0148932 A1 * | 7/2006 | Nohr et al. | 523/201 |
| 2006/0171870 A1 * | 8/2006 | Qi et al. | 423/265 |
| 2006/0248982 A1 * | 11/2006 | Yadav | 75/369 |
| 2006/0269739 A1 * | 11/2006 | Phillips et al. | 428/328 |
| 2007/0215009 A1 * | 9/2007 | Shimazu et al. | 106/600 |
| 2009/0004277 A1 * | 1/2009 | Franchini et al. | 424/489 |

\* cited by examiner

*Primary Examiner* — Cam N. Nguyen
(74) *Attorney, Agent, or Firm* — Dunlap Codding, P.C.

(57) ABSTRACT

A nanocomposite particle, its use as a catalyst, and a method of making it are disclosed. The nanocomposite particle comprises titanium dioxide nanoparticles, metal oxide nanoparticles, and a surface stabilizer. The metal oxide nanoparticles are formed hydrothermally in the presence of the titanium dioxide nanoparticles. The nanocomposite particle is an effective catalyst support, particularly for DeNO$_x$ catalyst applications.

6 Claims, No Drawings

NANOCOMPOSITE PARTICLE AND PROCESS OF PREPARING THE SAME

CROSS-REFERENCE TO RELATED APPLICATIONS

This application is a divisional of U.S. patent application Ser. No. 11/509,339, filed Aug. 24, 2006, the contents of which are hereby expressly incorporated in their entirety by reference.

FIELD OF THE INVENTION

This invention relates to a nanocomposite particle and a process for its preparation. The nanocomposite particle is useful as a catalyst and/or a catalyst support.

BACKGROUND OF THE INVENTION

Titanium dioxide is widely used as a catalyst and/or a catalyst support for many applications, including oxidation chemistry, hydrotreating, Claus reactions, photocatalysis, total oxidation of volatile organic compounds, and $DeNO_x$ reactions. The use of titanium dioxide as a catalyst support for the selective catalytic reduction of $NO_x$ is taught in, for example, U.S. Pat. Nos. 4,929,586, and 5,137,855. Although any crystalline form of titanium dioxide (anatase, rutile, and brookite) may be useful for catalyst applications, anatase is typically preferred, see, e.g., U.S. Pat. Nos. 5,330,953 and 6,576,589.

Unfortunately, titanium dioxide is thermally unstable when employed in high temperatures applications, such as $DeNO_x$. At high temperatures, the titanium dioxide nanoparticles tend to coalesce, which reduces their surface area and porosity. Moreover, anatase may be at least partially converted to the less favorable rutile form at high temperature.

A number of strategies have been employed to solve these problems. One approach has been to add a second metal oxide. For example, U.S. Pat. No. 5,021,392 discloses a binary oxide support (titanium dioxide-zirconia) that is formed from the coprecipitation of salts of titanium and zirconium to form hydrosol that is aged to produce the binary oxide support. U.S. Pat. No. 5,922,294 teaches a method of making a mixed-oxide by co-hydrolysis of a mixture of the alkoxides of titanium and alumina. U.S. Pub. Appl. No. 2003/0103889 discloses a method to make a titanium dioxide-silica composite that is prepared by combining the titanium dioxide with a silica sol. When the second metal oxide is incorporated into the titanium dioxide lattice to form a homogenous single mixed oxide, the crystal lattice and the catalytic properties of titanium dioxide are typically affected.

Another approach to solve the thermal instability problem is the application of a coating to the titanium dioxide. For example, U.S. Pat. No. 5,330,953 discloses forming two coatings on titanium dioxide particles that includes a first coating comprising oxides of aluminum, silicon, zirconium and lanthanum and a second phosphate coating. In addition, U.S. Pat. No. 5,652,192 discloses a hydrothermal method of making a titanium dioxide nanoparticle coated with sulfate. The method employs hydrothermal treatment of a mixture of precursors of titanium dioxide and sulfate to make titanium dioxide nanoparticles coated with sulfate in crystal form. One problem with this approach is that the coating can affect the catalytic properties of titanium dioxide.

In sum, a new titanium dioxide nanocomposite particle and processes for making them are needed. Particularly valuable nanocomposite particles would have improved thermal stability for catalytic applications.

SUMMARY OF THE INVENTION

The invention is a nanocomposite particle and a process for its production. The nanocomposite particle comprises titanium dioxide nanoparticles, metal oxide nanoparticles, and a surface stabilizer. The metal oxide nanoparticles are zirconium dioxide, cerium dioxide, hafnium oxide, tin oxide, niobium oxide and/or tantalum oxide. The surface stabilizer is silicon dioxide, aluminum oxide, phosphorus pentoxide, aluminum silicate and/or aluminum phosphate. The metal oxide nanoparticles are formed by hydrothermally treating an amorphous hydrated metal oxide in the presence of the titanium dioxide nanoparticles.

The nanocomposite particle is prepared by first forming a slurry comprising titanium dioxide nanoparticles, at least one soluble metal oxide precursor, and a solvent, followed by precipitating the soluble metal oxide precursor to form a slurry comprising titanium dioxide nanoparticles, amorphous hydrated metal oxide and the solvent. The slurry is then hydrothermally treated to convert the amorphous hydrated metal oxide to metal oxide nanoparticles and produce the nanocomposite particle comprising titanium oxide nanoparticles and metal oxide nanoparticles. A surface stabilizer is added before or immediately after the hydrothermal treatment.

Surprisingly, the nanocomposite particle exhibits enhanced thermal stability and is an active catalyst support for the $DeNO_x$ process.

DETAILED DESCRIPTION OF THE INVENTION

The nanocomposite particle of the invention comprises titanium dioxide nanoparticles, at least one metal oxide nanoparticle, and a surface stabilizer.

The titanium dioxide nanoparticles of the invention have an average crystallite size less than 200 nm, preferably from 1 to 100 nm, and most preferably from 2 to 20 nm. The titanium dioxide nanoparticles may be in the brookite, anatase or rutile phase. However, it is preferred that the titanium dioxide nanoparticles are predominantly anatase, as determined by X-ray diffraction patterns. By predominantly anatase, it is meant that the nanoparticles are at least 95 percent anatase, and most preferably greater than 98 percent anatase. The specific surface area of the titanium dioxide nanoparticles is typically about 10 to about 300 $m^2/g$, preferably from 20 to 200 $m^2/g$.

Suitable titanium dioxide nanoparticles may be purchased from Millennium Chemicals (TIONA® G1) or Kerr McGee (Tronox® Hydrate Paste). The titanium dioxide nanoparticles may also be prepared by any process known in the art. Processes for preparing titanium dioxide nanoparticles are well known in the art. See, for example, U.S. Pat. No. 4,012,338, which is incorporated herein by reference.

The nanocomposite particle comprises at least one metal oxide nanoparticle. The metal oxide nanoparticle helps to improve the thermal stability of the titanium dioxide nanoparticles. Suitable metal oxide nanoparticles possess low thermal expansion coefficients, good mechanical strength, and thermal stability at elevated temperatures. The metal oxide nanoparticles of the invention include nanoparticles of zirconium dioxide, cerium dioxide, hafnium oxide, tin oxide, niobium oxide, tantalum oxide, and mixtures thereof. Preferred metal oxide nanoparticles are zirconium dioxide and cerium dioxide, and most preferred are zirconium dioxide nanoparticles. The metal oxide nanoparticles of the invention have an average crystallite size less than 200 nm, preferably from 1 to 50 nm, and most preferably from 2 to 10 nm.

The nanocomposite particle also contains a surface stabilizer. The surface stabilizers of the invention include silicon dioxide, aluminum oxide, phosphorus pentoxide, aluminum silicate, and aluminum phosphate. More preferably, the surface stabilizer is silicon dioxide or aluminum oxide.

The nanocomposite particle preferably contains from 50 to 95 weight percent titanium dioxide, from 2 to 48 weight percent metal oxide, and from 2 to 20 weight percent of the surface stabilizer. More preferably, the nanocomposite particle contains from 60 to 90 weight percent titanium dioxide, from 4 to 40 weight percent metal oxide, and from 4 to 15 weight percent of the surface stabilizer.

The nanocomposite particle of the invention exhibits increased thermal stability. Preferably, the nanocomposite particle has a surface area greater than 60 $m^2/g$ after being calcined at 800° C. for 6 hours.

The metal oxide nanoparticles of the nanocomposite particle are formed by hydrothermally treating an amorphous hydrated metal oxide in the presence of the titanium dioxide nanoparticles.

The process of preparing the nanocomposite particle begins with first forming a slurry comprising titanium dioxide nanoparticles, at least one soluble metal oxide precursor, and a solvent. The order of adding the individual compounds to the slurry is not critical. For example, the titanium dioxide nanoparticles may be added to the solvent first, followed by addition of at least one soluble metal oxide precursor. Alternatively, the soluble metal oxide precursor may be added to the solvent, followed by the titanium dioxide nanoparticles; or the metal oxide precursor and the titanium dioxide nanoparticles may be added simultaneously to the solvent; or the solvent may be added to the other two components. The formed slurry comprises the dissolved metal oxide precursor(s) and solid titanium dioxide nanoparticles in the solvent. Preferably, the slurry will be thoroughly mixed to ensure that the slurry is homogeneous and the metal oxide precursor(s) is fully dissolved.

Preferably, the slurry contains from 3 to 30 weight percent of titanium dioxide nanoparticles, and more preferably 5 to 15 weight percent, based upon the total weight of the slurry.

The slurry contains at least one metal oxide precursor of zirconium dioxide, cerium dioxide, hafnium oxide, tin oxide, niobium oxide or tantalum oxide. Metal oxide precursors are metal-containing compounds (zirconium compounds, cerium compounds, aluminum compounds, hafnium compounds, tin compounds and/or niobium compounds) that form metal oxides when precipitated from the solvent. Although the process of the invention is not limited by choice of a particular metal oxide precursor, suitable metal compounds useful in the invention include, but are not limited to, metal halides, metal oxyhalides, metal alkoxides, metal acetates, and metal acetylacetonates of zirconium, cerium, hafnium, tin, niobium and tantalum. For example, zirconium tetrachloride, tantalum oxytrichloride, cerium acetate, niobium acetylacetonate, and tin tetraethoxide may be used.

The solvent is any liquid that is capable of dissolving the metal oxide precursor(s). Preferably, the solvent is water. However, nonaqueous protic solvents with high dielectric constants are also suitable. Preferred nonaqueous protic solvents are alcohols. Preferred alcohols include lower aliphatic $C_1$-$C_4$ alcohols such as methanol, ethanol, isopropanol, tert-butanol, and mixtures thereof. Blends of water and one or more nonaqueous protic solvents may also be employed.

After forming the slurry, the soluble metal oxide precursor is then precipitated from the slurry to form an amorphous hydrated metal oxide. Any suitable method that is capable of precipitating an amorphous hydrated metal oxide from solution may be employed in the process of the invention. For example, pH shift, solvent shift, ion exchange to form insoluble salts or hydroxides, condensation reactions, and thermal hydrolysis techniques may be employed. Preferably, the pH of the slurry is adjusted to a pH of 7 to 10 by adding an acid or base that is capable of precipitating the metal oxide from the slurry. The pH adjusting substance is preferably a base, or an acid, that will be decomposed during post treatment, e.g., by calcination of the nanocomposite particle. Suitable bases include amines, ammonia, and any organic base with $pK_a$ of 9.0 or greater. Ammonia is most preferred. Any inorganic or organic acid may also be employed. Preferred acids include nitric acid, sulfuric acid and hydrochloric acid; nitric acid is most preferred.

Following precipitation, the slurry comprises titanium dioxide nanoparticles, amorphous hydrated metal oxide and the solvent. The amorphous hydrated metal oxide may be deposited on the surface of the titanium dioxide nanoparticles, free-floating in the slurry, or a mixture of both.

Following the precipitation step, the slurry is hydrothermally treated in order to convert the amorphous hydrated metal oxide to metal oxide nanoparticles and produce a nanocomposite particle comprising titanium oxide nanoparticles and metal oxide nanoparticles. The hydrothermal treatment consists of heating the slurry to a high temperature, preferably at elevated pressure. Preferably, the slurry is heated to a temperature from 60° C. to 250° C. and at a pressure of from 20 to 500 psig. More preferably, the slurry is heated to a temperature from 80° C. to 130° C. and at a pressure of from 20 to 200 psig.

Preferably, the slurry is hydrothermally treated for a period of time between 3 to 24 hours, however the time is not critical. The temperature, pressure and the time of hydrothermal treatment must be sufficient for the nucleation and growth of metal oxide nanoparticles. One advantage of the hydrothermal process is that it forms metal oxide nanoparticles under relatively mild reaction conditions which may minimize any effect on the surface properties and crystal structure of the titanium dioxide nanoparticles.

The surface stabilizer is added before or immediately after the hydrothermal treatment. In one method, the surface stabilizer may be added to the slurry at any time prior to the hydrothermal treatment. For instance, the surface stabilizer may be added to the slurry prior to precipitating the amorphous hydrated metal oxide or following the precipitation of the amorphous hydrated metal oxide. The slurry will then be processed in the manner described above. Alternatively, the surface stabilizer may be added immediately after the hydrothermal treatment, i.e., prior to separation of the nanocomposite particle product from the solvent, and optional calcination. Preferably, the surface stabilizer will be added to slurry with thorough mixing. Typically, the slurry is mixed for a period of one minute to three hours following surface stabilizer addition. Suitable compounds for the surface stabilizer include amorphous silicon dioxide, including colloidal silicon dioxide, halides or alkoxides of silicon and aluminum, and aluminum phosphate.

Following hydrothermal treatment, the nanocomposite particle product is preferably separated from the solvent by any means (e.g., filtration, decantation, centrifugation, and the like), washed with water, and dried. Preferably, the nanocomposite particle is calcined by firing at an elevated temperature. Calcination may be performed in the presence of oxygen (from air, for example) or an inert gas which is substantially free of oxygen such as nitrogen, argon, neon, helium or the like or mixture thereof. Optionally, the calcination may be performed in the presence of a reducing gas, such as carbon monoxide. The calcination is preferably performed at a temperature of at least 250° C. More preferably, the calcination temperature is at least 300° C. but not greater than 1000° C. Typically, calcination times of from about 0.5 to 24 hours will be sufficient.

The invention also comprises a catalyst containing the nanocomposite particle. The catalyst comprises the nanocomposite particle and at least one metal component. The metal component comprises one or more metals, including platinum, gold, silver, palladium, copper, tungsten, molybdenum, vanadium, iron, rhodium, nickel, manganese, chromium, cobalt, and ruthenium. The metal component may be the metal itself or any compound that contains the metal. Preferably, the metal component is a metal oxide.

Typically, the amount of metal present in the catalyst will be in the range of from 0.001 to 30 weight percent, preferably 0.005 to 20 weight percent, and particularly 0.01 to 10 weight percent, based upon the total weight of the catalyst.

The catalyst can be prepared by any suitable method. In one method, the metal component is added during the preparation of the nanocomposite particle itself. For instance, the metal component may be added to the slurry before or after the hydrothermal treatment and processed in the same manner as described above. Alternatively, the metal component can be deposited directly onto the nanocomposite particle. For example, the metal component may be supported on the nanocomposite particle by impregnation, adsorption, precipitation, or the like.

Suitable metal components include the metals themselves, in addition to the metal alkoxides such as tungsten ethoxide, metal halides such as tungsten chloride, metal oxyhalides such as tungsten oxychloride, metallic acids such as tungstic acid, and metal oxides such as ammonium tungstate, vanadium pentoxide, molybdenum oxide and copper monoxide.

Preferred catalysts contain tungsten trioxide and/or vanadium pentoxide. Preferably, the catalyst comprises 0.1 to 10 weight percent vanadium pentoxide and 4 to 20 weight percent of tungsten trioxide, more preferably between 0.2 to 7 weight percent vanadium pentoxide and between 4 to 16 weight percent tungsten trioxide, and most preferably between 0.2 to 5 weight percent vanadium pentoxide and 5 to 12 weight percent tungsten trioxide.

The nanocomposite particle can be calcined before or after the addition of the metal component. The temperature at which the nanocomposite particle is calcined depends on the end use for which it is intended. Preferably, the calcination is performed at a temperature from 400° C. to 900° C., more preferably from 600° C. to 800° C., and most preferably from 650° C. to 750° C.

The catalyst is particularly useful in $DeNO_x$ applications. The $DeNO_x$ application comprises contacting a waste stream containing nitrogen oxides with the catalyst to reduce the amount of nitrogen oxides in the waste stream. Such applications are well known in the art. In this process, nitrogen oxides are reduced by ammonia (or another reducing agent such as unburned hydrocarbons present in the waste gas effluent) in the presence of the catalyst with the formation of nitrogen. See, for example, U.S. Pat. Nos. 3,279,884, 4,048,112 and 4,085,193, the teachings of which are incorporated herein by reference.

The following examples merely illustrate the invention. Those skilled in the art will recognize many variations that are within the spirit of the invention and scope of the claims.

Example 1

Nanocomposite Preparation

Nanocomposite 1A

Titanium Dioxide Nanoparticle Preparation: A $TiSO_4$ solution (2000 g, 7.6 wt. % $TiO_2$) is charged to a 3-L reactor and the pH of the solution is adjusted to about 1 with an ammonium hydroxide solution (29% $NH_3$ in water, product of Aldrich) under constant stirring at room temperature. Urea (550 g) is then dissolved in the solution and the temperature is raised to 98° C. for 3 h. After cooling, the titanium dioxide nanoparticles are separated by filtration and washed with water. The filtered titanium nanoparticles are redispersed in water to form a 2-L slurry.

Nanocomposite Preparation: One half of the 2-L slurry is added to a 2-L beaker and $ZrOCl_2.8H_2O$ (50 g) is dissolved in the slurry. Under strong agitation, an ammonium hydroxide solution (29% $NH_3$ in water) is added slowly until the pH of the slurry is about 10 and the $ZrO_2$ precipitates. Fumed $SiO_2$ (5 g) is then added to the slurry, the slurry is charged to a 2-L stirred hydrothermal reactor and hydrothermally treated at 90° C. for 12 h. The product is cooled, separated by filtration and washed with water. The washed cake is dried in an oven at 100° C. for 12 hours and calcined in a furnace at 800° C. for 6 hours to produce Nanocomposite 1A.

Nanocomposites 1B-1H: The nanocomposite particle procedure of Nanocomposite 1A above is followed except that a commercial $TiO_2$ nanoparticle (Millennium Tiona® G1) is used. Particles 1B, 1C, and 1D, 1E, and 1F use fumed $SiO_2$ as surface stabilizer, Particle 1G uses $SiO_2$ sol as surface stabilizer, and Particle 1H uses aluminum phosphate as the surface stabilizer. The amounts of $TiO_2$, $ZrO_2$ and surface stabilizer are varied to provide Nanocomposite 1B, 1C, 1D, 1E, 1F, 1G and 1H of varying composition.

Comparative Nanocomposites 1I-1J: The nanocomposite particle procedure of Nanocomposite 1B is followed except that $ZrO_2$ is omitted for Nanocomposite 1I, and $SiO_2$ is omitted for Nanocomposite 1J.

The resulting nanocomposites (following calcination at 800° C.) are analyzed for composition, surface area, pore volume and $TiO_2$ and $ZrO_2$ crystal size measurement. See Table 1 for the results.

The formation of the metal oxide nanoparticles following the hydrothermal treatment was confirmed by x-ray diffraction testing. Prior to the hydrothermal treatment, only the titanium dioxide nanoparticles were detected by x-ray diffraction. Following the hydrothermal treatment, a second crystal phase is detected corresponding to the metal oxide nanoparticles.

Example 2

$DeNO_x$ Catalyst Preparation

The catalyst is prepared according to the procedure described in co-pending U.S. application Ser. No. 10/968,706. The nanocomposite (75 g) is slurried in deionized water (175 mL) and concentrated sulfuric acid is added until the pH reaches 0. An ammonium paratungstate solution (9.38 g AMT in 150 mL deionized water, formed by mixing at 50° C.) is added to the nanocomposite slurry and mixed for 1 h. The powder is filtered, dried at 110° C. overnight, and then calcined at 500° C. for 6 h. The powder (10 g) is then added to a vanadium oxide solution (0.185 g monoethanolamine and 0.092 g $V_2O_5$ in 20 mL deionized water, formed by mixing at 60° C. until dissolution) and stirred for 10 min. The solvent is evaporated under vacuum and the solid is dried at 110° C. overnight, and then calcined at 600° C. for 6 h. The catalysts contained approximately 10 wt. % $WO_3$ and 0.9 wt. % $V_2O_5$.

Nanocomposites 1A, 1B, 1C, 1D, 1E, 1F, 1G, 1H, 1I, and 1J are used to form Catalysts 2A, 2B, 2C, 2D, 2E, 2F, 2G, 2H, 2I, and 2J, respectively.

Example 3

DeNO$_x$ Test

The catalysts are loaded into a conventional plug flow reactor with a feed consisting of 300 ppm NO, 360 ppm $NH_3$, 3% $O_2$, 10% $H_2O$ and balance $N_2$ at a space velocity is 80,000/hr. The $NH_3$ catalytic reduction is performed at 270° C. and 320° C.

The results are shown in Table 2. The results are recorded as percent NO conversion and activity. The activity is expressed as k*tau where k*tau represents the activity constant multiplied by the contact time. It is generally accepted that ammonia ($NH_3$) selective catalytic reduction is first order with respect to NO, and zero order with respect to $NH_3$. Therefore, the activity is calculated from conversion as k*tau=−ln (1-conversion) where conversion is represented as a fraction of 1.

TABLE 1

Amounts of $TiO_2$, $ZrO_2$ and Surface Stabilizer in the Nanocomposite Particles

| Nano. # | $TiO_2$ (wt. %) | $ZrO_2$ (wt. %) | $SiO_2$ or $AlPO_4$ (wt. %) | S.A. (m2/g) | P.V. (cm3/g) | Crystal size (nm) $TiO_2$ | Crystal size (nm) $ZrO_2$ |
|---------|-----------------|-----------------|------------------------------|-------------|--------------|---------------------------|---------------------------|
| 1A | 76 | 19 | 5 | 156 | 0.33 | 6.8 | — |
| 1B | 90 | 5 | 5 | 97 | 0.39 | 17.0 | 6.8 |
| 1C | 80 | 15 | 5 | 109 | 0.76 | 14.5 | 6.2 |
| 1D | 70 | 25 | 5 | 112 | 0.78 | 14.6 | 6.4 |
| 1E | 55 | 40 | 5 | 110 | 0.65 | 14.5 | 7.3 |
| 1F | 75 | 15 | 10 | 133 | 0.75 | 12.4 | 5.7 |
| 1G | 75 | 15 | 10 | 143 | 0.71 | 10.8 | 4.0 |
| 1H | 80 | 15 | 5 | 98 | 0.76 | 15.8 | 6.7 |
| 1I* | 95 | 0 | 5 | 78 | 0.30 | 19.8 | |
| 1J* | 80 | 20 | 0 | 51 | 0.67 | 21.9 | 11.4 |

*Comparative Example

TABLE 2

DeNO$_x$ Results

| | 270° C. Runs | | 320° C. Runs | |
|---|---|---|---|---|
| Catalyst | NO Conversion (%) | Activity (k*tau) | NO Conversion (%) | Activity (k*tau) |
| 2A | 39.6 | 0.504 | 70.6 | 1.224 |
| 2B | 77.9 | 1.511 | 91.7 | 2.492 |
| 2C | 59.5 | 0.903 | 91.4 | 2.452 |
| 2D | 64.2 | 1.028 | 88.1 | 2.13 |
| 2E | 55.0 | 0.80 | 77.0 | 1.470 |
| 2F | 44.9 | 0.596 | 84.6 | 1.870 |
| 2G | 39.6 | 0.504 | 70.9 | 1.234 |
| 2H | 59.9 | 0.915 | 82.3 | 1.732 |
| 2I* | 54.8 | 0.795 | 74.6 | 1.369 |
| 2J* | 53.5 | 0.765 | 72.1 | 1.277 |

* Comparative Example

We claim:

1. A process for reducing nitrogen oxides in a waste stream, the process comprising the step of:
    contacting a waste stream containing nitrogen oxides with a catalyst, the catalyst comprising:
        (A) a nanocomposite particle, the nanocomposite particle comprising:
            (i) titanium dioxide nanoparticles wherein the titanium dioxide nanoparticles are predominantly anatase;
            (ii) metal oxide nanoparticles selected from the group consisting of zirconium dioxide, cerium dioxide, hafnium oxide, tin oxide, niobium oxide and tantalum oxide; and
            (iii) a surface stabilizer selected from the group consisting of silicon dioxide, aluminum oxide, phosphorus pentoxide, aluminum silicate and aluminum phosphate,
        wherein the metal oxide nanoparticles are formed by hydrothermally treating an amorphous hydrated metal oxide in the presence of the titanium dioxide nanoparticles; and
        (B) at least one metal component, the at least one metal component comprising: a metal selected from the group consisting of platinum, gold, silver, palladium, copper, tungsten, molybdenum, vanadium, iron, rhodium, nickel, manganese, chromium, cobalt, and ruthenium with the result that the amount of nitrogen oxides in the waste stream is reduced.

2. The process of claim 1, wherein the at least one metal component is selected from the group consisting of tungsten and vanadium.

3. The process of claim 2, wherein the catalyst comprises about 0.1 to about 10 weight percent vanadium and about 4 to about 20 weight percent tungsten.

4. The process of claim 1, wherein the metal oxide nanoparticles are zirconium dioxide.

5. The process of claim 1, wherein the nanocomposite particles comprise about 50 to about 95 weight percent of titanium dioxide nanoparticles, about 2 to about 48 weight percent metal oxide nanoparticles, and about 2 to about 20 weight percent surface stabilizer.

6. The process of claim 1, wherein the nanocomposite particle has a surface area greater than about 60 $m^2$/g after being calcined at 800° C. for six hours.

* * * * *